(No Model.)

G. HAYES.
METALLIC LATHING.

No. 420,658. Patented Feb. 4, 1890.

WITNESSES:
James R. McAfee.
Arthur Hayes

INVENTOR
Geo. Hayes

UNITED STATES PATENT OFFICE.

GEORGE HAYES, OF NEW YORK, N. Y.

METALLIC LATHING.

SPECIFICATION forming part of Letters Patent No. 420,658, dated February 4, 1890.

Application filed August 26, 1889. Serial No. 321,980. (No model.)

*To all whom it may concern:*

Be it known that I, GEORGE HAYES, a resident of the city, county, and State of New York, have invented a new and useful Metallic Lathing, of which the following is a specification.

My invention consists of a lathing of sheet metal having at intervals throughout oblong apertures, each aperture having two tongues or hooks of the metal turned outward in forming the apertures, one tongue at each end of the oblong aperture and projecting beyond the plane of the sheet, and with a bend backward from the aperture, so that they will become embedded in the mortar when applied thereto, and serve to secure the same to the lathing-sheet, all as hereinafter more fully described, reference being had to the accompanying drawings, in which—

Figure 1:
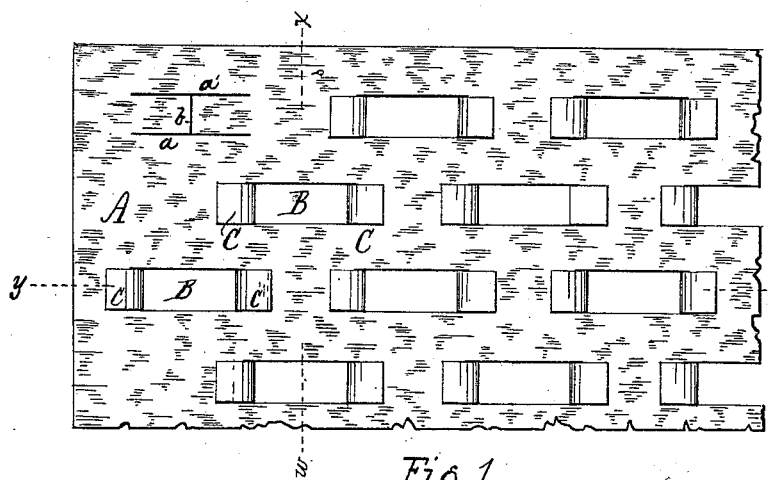
Figure 2:
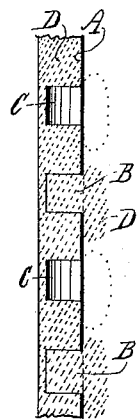
Figure 3:
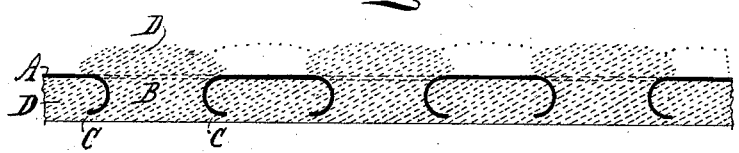
Figure 4:
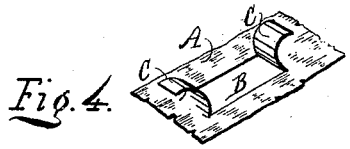

Figure 1 represents a face view of a piece of the lathing sheet or strip provided with the aperture and projecting hooks. At the upper left-hand corner is shown the cuts for an opening as before the hooks are formed. Fig. 2 shows a section of the same lath, on line $w\,x$ of Fig. 1, as applied vertically. Fig. 3 is a section of the lath as applied to a ceiling. Fig. 4 is a perspective view of a piece of the lath with one opening.

On the drawings, A indicates the sheet-metal lath, B the apertures, and C the turned-out metal forming the hooks or barbs. In forming the same I cut the metal, as shown in the upper left-hand corner of Fig. 1, with two long parallel slits $a$ and $a'$, united at a point intermediate of their length by a cross-slit $b$, forming an H. Then I force outwardly the metal bounded by the cuts and backwardly to each end to form the hooks.

Plaster when applied to the surface of the lath beds itself around the hooks.

What I claim as new, and desire to secure by Letters Patent of the United States, is—

1. A lath of sheet metal having at intervals throughout apertures of oblong shape, each having at its two short sides or ends the edge metal turned outwardly with a backward curve from the aperture and projecting as tongues, hooks, or barbs to grasp plaster, as herein set forth.

2. A lath of sheet metal having at intervals throughout apertures of oblong shape, each having at its two short sides or ends projecting curved tongues of the metal turned outward in forming the apertures, essentially as shown and described.

3. A lath of sheet metal having at intervals throughout oblong apertures, each having at its two short sides or ends projecting curved tongues of the metal turned outward in forming the openings, and the said tongued apertures arranged in diagonal lines across the sheet, as shown and described.

GEO. HAYES.

Witnesses:
JAMES R. MCAFEE,
ARTHUR HAYES.